Aug. 16, 1932.　　I. HECHENBLEIKNER　　1,872,638
MANUFACTURE OF NITRIC ACID FROM AMMONIA
Filed Jan. 31, 1928
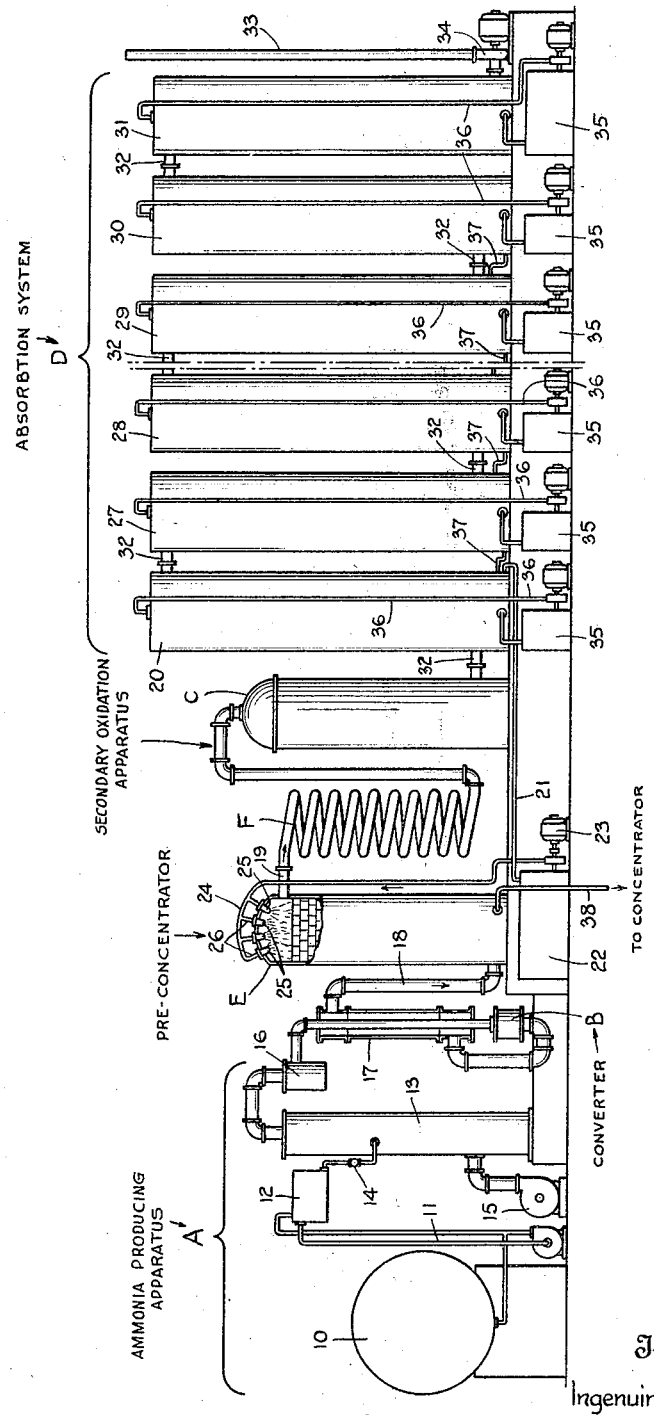
Inventor
Ingenuin Hechenbleikner
By his Attorneys Patented Aug. 16, 1932

1,872,638

UNITED STATES PATENT OFFICE

INGENUIN HECHENBLEIKNER, OF CHARLOTTE, NORTH CAROLINA, ASSIGNOR, BY MESNE ASSIGNMENTS, TO CHEMICAL CONSTRUCTION CORPORATION, A CORPORATION OF DELAWARE

MANUFACTURE OF NITRIC ACID FROM AMMONIA

Application filed January 31, 1928. Serial No. 250,842.

This invention relates to the manufacture of nitric acid, and relates more particularly to the process of manufacturing nitric acid by the oxidation or catalyzing of ammonia; and has special reference to the provision of an improved method of and apparatus for concentrating the nitric acid obtained from the oxidation and absorption systems of the process.

In the process of making nitric acid from catalyzed ammonia, nitrous oxide gases generated in the converter or catalyzing apparatus admixed with oxygen in the form of air, after being cooled from the high temperatures incident to catalysis down to the temperatures necessary for speeding the reactions in the absorption system, are led into the absorption system where the gas mixture is oxidized to the higher oxides of nitrogen, which are in turn absorbed by weak nitric acid circulating through the towers of the absorption system.

In the oxidation of the nitrous oxide gas and the absorption of the higher oxides to nitric acid in the absorption system of the process, it is not practical nor economical to produce a resulting nitric acid of a strength greater than 50% $HNO_3$, as otherwise both the capacity and yield of the plant decrease. It has been found possible, by employing a refrigeration and artificial cooling method or a method of absorbing the gases under high pressures, to produce a stronger acid; but neither of these two methods is economically feasible due to the higher operating costs involved and due to the mechanical difficulties encountered in the apparatus employed. Practical and economical factors therefore limit the production of nitric acid in the absorption system to a strength of about 50% $HNO_3$; and this relatively weak nitric acid derived from the absorption system is then concentrated to higher strengths by other apparatus, such as a nitric acid concentrator.

The prime desideratum of my present invention centers about the provision of an improved method of and apparatus for producing nitric acids of higher strengths or concentration in the oxidation and absorption systems of the process, and more particularly to a process of preconcentrating the nitric acids generated in and derived from the absorption system before they are delivered to the nitric acid concentrator where the concentration to 95% or 97% strength is completed.

To the accomplishment of the foregoing and such other objects as will hereinafter appear, my invention consists in the process, the steps thereof, the apparatus and the elements thereof and their relation one to the other as hereinafter more particularly described and sought to be defined in the claims; reference being had to the accompanying drawing which shows the preferred embodiment of my invention, and in which:

The figure is a view showing a plant layout designed for the manufacture of nitric acid from ammonia and embodying the principles of my present invention.

Referring now more in detail to the drawing, showing the apparatus preferably employed in the process up to (but not including) the step of completing the concentration of the nitric acid produced, a mixture of ammonia gas and air produced in the apparatus included in the bracket generally designated as A is conducted into the converter B, where the said gas mixture is oxidized or converted by catalysis into a nitrous oxide gas mixture which in turn, after being led through a secondary oxidation apparatus C, is passed into the absorption system generally designated as D, where the gas mixture receives a further secondary oxidation to the higher oxides of nitrogen which in turn are absorbed by weak nitric acid (circulating in the absorption system) to produce the nitric acid which is subsequently concentrated to higher strengths.

In accordance with the principles of my present invention, the nitric acid obtained from the absorption system D is preconcentrated by an apparatus generally designated as E interposed between the converter B and the absorption system D, the said apparatus being so connected to the converter and absorption systems as to effect a heat exchange between the absorption system nitric acid and a stream of the hot gas mixture coming from the converter, the heat exchange producing the preconcentration of the nitric acid as well as a cooling of the gases to precondition the same for most efficient use in the absorption system.

The ammonia producing apparatus A comprises a tank 10 for aqua-ammonia or the like, from which the ammonia is elevated by a pumping apparatus 11 to a constant level tank 12 from which the ammonia flows into a stripping column 13, the flow of the liquid being regulated and controlled by a valve apparatus 14. The aqua-ammonia flows down the stripping column over the tower packing therein and comes in contact with a stream of air ascending the column and delivered from a blower 15. A steam coil (not shown) at the base of the tower keeps the waste water therein slightly below the boiling point, and the heated air strips the ammonia gas from the liquid, the mixture passing into a filtering apparatus 16 which functions to remove dust and like particles from the gas stream.

The mixture of ammonia and air coming from the filter 16 is delivered to the converter B through a heat exchanger 17 where the gas mixture is preheated to bring the same up to a temperature of about 300° C. This preheated gas mixture is then oxidized by catalysis in the converter B to a nitrous oxide mixture, which converter operates at very high temperatures such, for example, as at 1000° C.

In accordance with my present invention, the high temperature of the converted gas mixture coming from the heat exchanger 17 is utilized to concentrate by evaporation the nitric acid produced in the absorption system D; and to this end the gas flow emanating from the heat exchanger 17 is admitted by the pipe 18 into the apparatus E which forms in effect a hot tower, the exit gases therefrom being conducted through the pipe 19 and into the chamber C. The hot gas mixture thus flowing through the packed tower E is caused to act upon a stream or spray of nitric acid which is taken from the first absorption tower 20 (the highest nitric acid concentration) and delivered by means of the pipe 21 into a tank 22 from which tank the acid, which is at about 50% strength, is pumped by means of the pumping apparatus 23 through a pipe 24 and into preferably a plurality of spraying nozzles 25, 25 through the parallel pipe paths 26, 26. The nitric acid thus sprayed through the tower comes in intimate contact with the flow of the gas mixture moving counter-current thereto, with the result that the acid is preconcentrated by evaporation. I have found that nitric acid obtained at a strength of 50% from the absorption tower 20 may be thus preconcentrated to from 63% to 68% $HNO_3$ strength. This concentration involves an enormous saving in the subsequent concentration of the nitric acid to a strength of from 95% to 97%, since the water contents are reduced by this preconcentration step by about 33⅓%. While the constant boiling point of nitric acid is about 68% strength corresponding to 120½° C. and therefore while in a large scale commercial operation the maximum strength of 68% is difficult of attainment, I have found that this optimum condition is reached closely in practice by the obtaining of strengths of from 63% $HNO_3$ to 66% $HNO_3$.

As is well known, the oxides coming from the converter must be artificially cooled before they are susceptible of oxidizing to the higher oxides such as $N_2O_3$, $NO_2$ and $N_2O_5$; and this cooling is substantially accomplished by the heat exchange taking place in the hot tower or apparatus E. The chamber or tower C, which preferably is open, that is, not provided with any packing, then acts upon the cooled gases to effect a substantial secondary oxidation thereof, and this relieves the absorption tower from a large part of the oxidizing reactions normally taking place therein. The secondary oxidation in the tower C therefore is accelerated by the use of the hot tower E of my invention, so that I am enabled not only to preconcentrate the nitric acid, but to effect that preconditioning of the gases which assists and speeds further reaction. I have found also that the hot tower E serves or acts as an oxidizing chamber for the lower oxides.

The vapors leaving the hot tower E normally carry too much moisture to be suitable for direct insertion into the strong end of the absorption system D, this moisture coming from both the evaporation of the weak nitric acid in the apparatus or hot tower E and from the oxidation of the hydrogen in the ammonia. The nitrous oxide content of such vapors, however, is so high as to make it desirable to introduce them into the strong end of the absorption system. Therefore in accordance with the preferred practice of my invention, such gases are cooled down below their dew point and such cooling is taken as far as is reasonably and cheaply obtained with normal cooling water, as available in each locality. This cooling may be effected by a condenser F which serves to condense out all the moisture present, the moisture leaving the condenser in the form of water or diluted nitric acid depending upon whether the condenser is positioned between the hot tower E and the tower C or between the tower C and the adjacent absorption tower 20 of the absorption system. If diluted nitric acid is obtained, it may be returned to the absorption system in lieu of an equal amount of fresh water for make-up purposes and this dilute acid is preferably introduced into an absorption tower which produces acid of corresponding strength.

The absorption system D may comprise a number of absorption towers such as 20 and 27—31 connected by the piping 32, 32 for gas flow intercommunication, the last tower 31 comprising a nitrite tower being provided with an exhaust 33 through which the waste gases are blown by an exhauster 34. Each of the towers 20 and 27—31 is provided with an acid circulating apparatus comprising a tank 35 and a circulating and pumping apparatus generally designated as 36 for circulating the absorption acid in each tower, and the towers 20 and 27 to 30 are connected for acid flow communication by the piping 37, 37, the piping being arranged so as to effect a flow of the acid from the tower 30 of weakest acid strength to the tower 20 of strongest acid strength. From the tower 20 the acid is delivered by the pipe line 21 to the tank 22 which is associated with the hot tower E.

The preconcentrated acid obtained in the apparatus E and having exit therefrom at the bottom of the tower E is then led through the pipe line 38 into the nitric acid concentrator (not shown) where the preconcentrated acid is concentrated to the higher strengths, such as 95% to 97% $HNO_3$.

The manner of practicing the process of my invention and employing the apparatus used therewith will in the main be fully apparent from the above detailed description thereof. It will be further apparent that by employing the hot tower E interposed between the converter B and the absorption system D, which hot tower acts to effect a heat exchange between the hot gases coming from the converter and the cooled nitric acid coming from the absorption towers, I am enabled to produce an effective preconcentration of the nitric acids from a 50% strength obtained in the absorption system to a strength of from 63 to 68%, this being obtained, moreover, by utilizing the heat generated in the process, and more particularly in the catalyzing stage thereof. It will be further seen that this preconcentration of the nitric acid is accompanied with a desired cooling of the converter gases, thereby conditioning the same for the temperatures required for a high speed of reaction and absorption in the absorption towers. It will be further seen that by means of the invention not only does the hot tower function to effect an evaporation and concentration of the weak nitric acid and as a cooler for the gases, but as an oxidizing chamber for the lower oxides; and the use of this preconcentration step enables the effecting of substantial savings in the subsequent concentration stage of the nitric acid.

It will be also understood from the foregoing that by employing the hot tower E considerable of the secondary oxidation may be carried out in the oxidizing chamber C, thus greatly relieving the absorption system from the full burden of oxidizing all of the lower oxides to the higher oxides, this producing a greater efficiency in absorption. It will also be understood that the preconcentration step described may be carried out only for a part of the nitric acid produced depending upon the needs of service or the preferred requirements.

While I have shown and described my invention in the preferred form, it will be further apparent that many changes and modifications may be made in the structure disclosed without departing from the spirit of my invention, defined in the following claims.

I claim:

1. In the process of making nitric acid from ammonia the method which includes feeding a mixture of ammonia gas and air into a converter and generating therein a hot nitrous oxide gas mixture, passing said hot gas mixture in contact with nitric acid derived from an absorption system to pre-concentrate the same and to cool the said hot gas mixture, oxidizing the same to higher oxides of nitrogen, and then passing the gas mixture into the aforesaid absorption system.

2. In the process of making nitric acid from ammonia which includes the steps of feeding a mixture of ammonia gas and air into a converter and generating therein a hot nitrous oxide gas mixture, passing said hot gas mixture in countercurrent contact with nitric acid derived from an absorption system to pre-concentrate the same and to cool the said hot gas mixture, further cooling the gas mixture and oxidizing the same to form higher oxides of nitrogen, and then passing the gas mixture into the aforesaid absorption system.

3. In an apparatus for the manufacture of nitric acid from ammonia, a converter, an absorption system, a pre-concentrator chamber interposed between the converter and the absorption system, connections for conducting the gas flow from the converter through the reconcentrator chamber and for conducting an acid flow from the absorption system into the preconcentrator chamber, a secondary oxidation chamber and connections for conducting the gas flow from the preconcentrator chamber through the secondary oxidation chamber and into the absorption system.

4. In an apparatus for the manufacture of nitric acid from ammonia, a converter, an absorption system, a pre-concentrator chamber interposed between the converter and the absorption system, connections for conducting the gas flow from the converter through the preconcentrator chamber and for conducting an acid flow from the absorption system into the preconcentrator chamber, cooling means, a secondary oxidation chamber, and connections for conducting the gas flow from the preconcentrator chamber through the cooling means and the secondary oxidation chamber and into the absorption system.

5. In the process of making nitric acid from ammonia, the method which includes the steps of feeding a mixture of ammonia gas and air into a converter and generating therein a hot nitrous oxide gas mixture, passing the said hot gas mixture in contact with nitric acid to preconcentrate the same and to cool the said hot gas mixture, and finally oxidizing the gas mixture to higher oxides of nitrogen and absorbing the same in an appropriate absorption system.

6. In the process of making nitric acid from ammonia, the method which includes the steps of feeding a mixture of ammonia gas and air into a converter and generating therein a hot nitrous oxide gas mixture, passing the said hot gas mixture in countercurrent contact with nitric acid to preconcentrate the same and to cool the said hot gas mixture, further cooling the gas mixture, and finally oxidizing the gas mixture to higher oxides of nitrogen and absorbing the same in an appropriate absorption system.

7. In an apparatus for the manufacture of nitric acid from ammonia, a converter, a secondary oxidation and absorption system, a preconcentrator chamber interposed between the converter and the said system, connections for conducting the gas flow from the converter through the preconcentrator chamber and for feeding nitric acid into the preconcentrator chamber and connections for conducting the gas flow from the preconcentrator chamber to the secondary oxidation and absorption system.

8. In an apparatus for the manufacture of nitric acid from ammonia, a converter, a secondary oxidation and absorption system, a preconcentrator chamber interposed between the converter and the said system, connections for conducting the gas flow from the converter through the preconcentrator chamber and for feeding nitric acid in counter current relation into the preconcentrator chamber cooling means, and connections for conducting the gas flow from the preconcentrator chamber through the cooling means to the secondary oxidation and absorption system.

Signed at Charlotte, in the county of Mecklenburg and State of North Carolina, this 28th day of January A. D. 1928.

INGENUIN HECHENBLEIKNER.